March 6, 1962   T. L. ROBINSON   3,024,151
PRINTED ELECTRICAL CIRCUITS AND METHOD
OF MAKING THE SAME
Filed Sept. 30, 1957   3 Sheets-Sheet 1

INVENTOR.
Thomas L. Robinson,
BY
Parker & Prochnow,
Attorneys.

March 6, 1962

T. L. ROBINSON 3,024,151

PRINTED ELECTRICAL CIRCUITS AND METHOD
OF MAKING THE SAME

Filed Sept. 30, 1957

INVENTOR.
Thomas L. Robinson
BY
Parker & Burchnor
Attorneys.

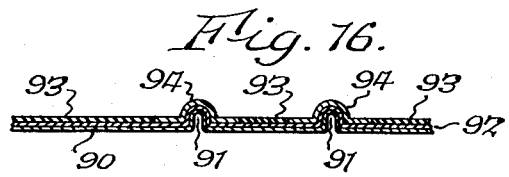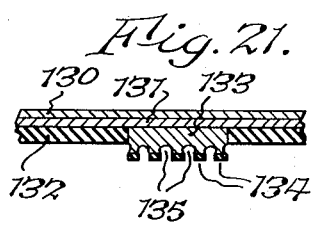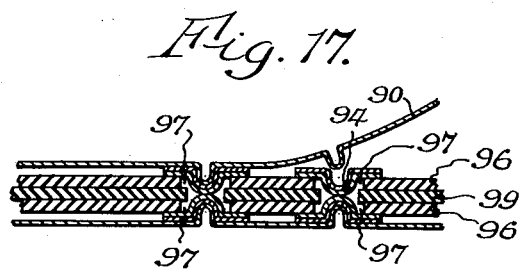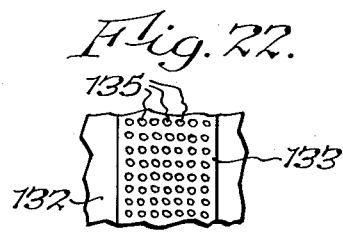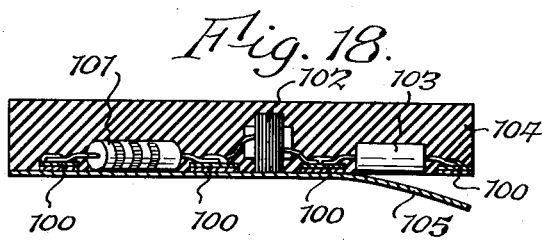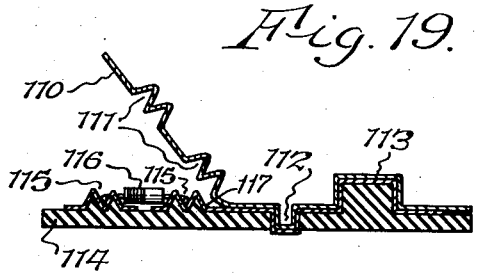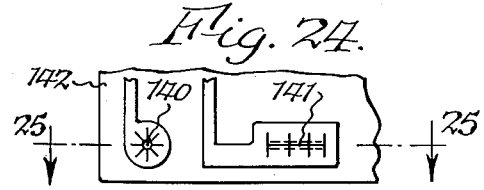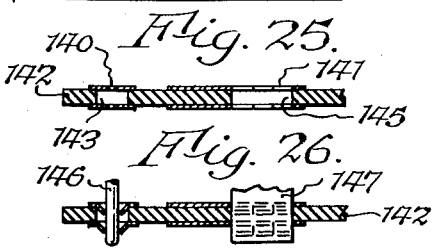

United States Patent Office 3,024,151
Patented Mar. 6, 1962

3,024,151
PRINTED ELECTRICAL CIRCUITS AND METHOD OF MAKING THE SAME
Thomas L. Robinson, Buffalo, N.Y., assignor to Automated Circuits, Inc., North Tonawanda, N.Y.
Filed Sept. 30, 1957, Ser. No. 687,120
12 Claims. (Cl. 156—150)

This invention relates to improvements in printed electrical circuits and to methods of making the same. This application is a continuation-in-part of my copending application Ser. No. 464,865, filed October 26, 1954.

One of the objects of this invention is to provide an improved method of making electrical circuits of a type which can be produced economically and efficiently by first forming the same on a flexible carrier and then transferring the circuit to a permanent base by the use of resins and adhesives.

A further object is to provide a method of this kind by means of which a printed circuit may be applied to a curved or other irregular surface as well as on a plane surface.

Another object is to provide a printed circuit and a method of making the same whereby transferred circuits on each side of a permanent insulating base can make electrical contact through a hole in a permanent base without the steps of drilling or otherwise forming holes in the base and then applying a separate metal conductive plating in these holes to carry current from one face of a transferred circuit to the other side thereof.

A further object is to provide printed circuits and a method of making the same whereby certain electronic parts such as resistors, capacitors, coils and or other parts can be assembled and electrically tested for performance on a carrier before the circuit is transferred to a permanent base.

An additional object is to provide means for encapsulating or potting an electrically tested circuit in a resin or other base and having the test points or terminals accessible.

A further object is to provide a method of transferring circuits to more than two planes.

Still another object is to provide a method by means of which carrier sheets are formed for plating of circuits thereon in more than one plane.

It is also an object to provide a method of continuous and automatic forming of a large number of printed circuits without requiring any handling of the circuits.

A further object is to provide an improved apparatus and method of coating a carrier with a chemically deposited film by spraying or immersion.

It is also an object to provide a printed circuit in which the conductors while on the carrier sheet are roughened so as to form a very secure bond with a base to which these conductors are to be transferred.

Other objects and advantages will be apparent from the following description of some embodiments of the invention, and the novel features will be particularly pointed out hereinafter in connection with the appended claims.

In the accompanying drawings:

FIG. 16 is an enlarged section through a carrier and the films applied thereto formed for conducting current from one face of a base to the opposite face thereof;

FIG. 17 is a cross sectional view showing the manner of applying a part of printed circuits to opposite faces of a base so as to conduct current from one face thereof to the other;

FIG. 18 is an enlarged sectional view of a printed circuit having a number of different electronic devices applied thereto and embedded in a base.

FIG. 19 is an enlarged sectional view of a printed circuit in which the carrier is formed or shaped so that portions thereof are arranged in various planes.

FIG. 20 is an enlarged sectional view of a printed circuit formed to provide hard bearing faces on the conductors.

FIG. 21 is a fragmentary enlarged sectional view of a printed circuit prior to application of the same to a base and showing parts of the circuit roughened to produce an improved bond with a base.

FIG. 22 is a fragmentary face view of a portion of the circuit shown in FIG. 21.

FIG. 23 is a fragmentary section of a printed circuit of another modified form.

FIG. 24 is a fragmentary top plan view of a circuit provided with bendable lugs for connecting with a lead wire.

FIG. 25 is a section thereof on line 25—25, FIG. 24.

FIG. 26 is a similar section after leads have been applied thereto.

In carrying out my improved method it is necessary in the first place to provide a carrier having an electrical circuit suitably printed thereon in such a manner that the various conductors of the circuit are exposed for electroplating. This may be done either by employing a carrier having a layer of conducting material covering the entire surface thereof and then printing on the same with ink or other non-conducting material a reverse pattern of the circuit, i.e. applying the ink to the portions of the circuit which are arranged between conductors, thus leaving the conductors exposed, or the carrier may have the actual pattern of the circuit printed thereon by means of a thin layer of electricity-conducting material.

In FIGS. 1 to 9 I have illustrated diagrammatically by way of example, the steps which may be used in connection with my improved process according to the first of these alternative methods.

Figure 1:
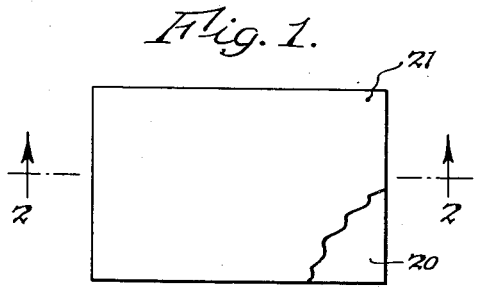
FIG. 1 is a face view, partly broken away, of a carrier used in connection with my improved process and having a layer or film of conducting material applied thereto.
Figure 2:
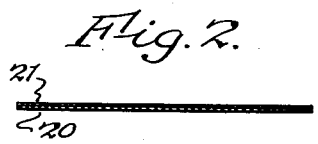
FIG. 2 is a sectional view thereof on line 2—2, FIG. 1.

In FIG. 1, 20 represents a carrier which is preferably in the form of a sheet of flexible, electrically non-conducting material, such for example as a suitable paper or a film of a suitable plastic material. 21 represents a layer of conducting material applied thereto. This layer 21 may be in the form of silver or other metal or current-conducting paint sprayed on the carrier, or it may be a metallic foil suitably secured to the face of the carrier. The circuit is then formed on the carrier by printing on the conducting surface thereof a reverse pattern of the circuit with a non-conducting ink or other suitable material, incdicated at 22. This printing will consequently leave exposed parts 23 of the conducting layer 21.

The next step in the process is to subject the carrier to electroplating for the purpose of increasing the thickness of the conducting parts of the circuit to the desired extent. This electroplating step may be performed in any usual or suitable manner heretofore commonly employed for this purpose and therefore is not herein shown in detail. The plating consequently results in materially enlarging the exposed, conducting parts 23, as indicated at 24 in FIG. 5. It must be borne in mind of course that the thickness of the parts as illustrated in the drawing is greatly exaggerated to render the drawings clearly understandable. The electroplated parts 24 may, of course, be made of any desired thickness and corresponding conductivity by controlling the time and intensity of the electroplating operation.

Figure 7:
FIG. 7 is a similar view showing the base applied to the carrier with the resin interposed between the carrier and the base.

When the circuit has been subjected to the desired amount of electroplating, it is transferred from the carrier to a suitable base 25, FIG. 7, and this is done preferably by means of a layer 26 of a suitable adhesive. The adhesive may be applied either to the base or to the carrier next to the conductor. Some pressure should be used to force the adhesive into the spaces between the conductors of the circuit, and the base with the carrier applied thereto is left, preferably under slight pressure, until the adhesive has hardened or set, unless the adhesive employed is of the type which will adhere to the circuit by merely pressing the same against the carrier.

Any suitable or desired adhesive may be employed. Certain types of plastic resins dissolved in their volatile solvents have been found very suitable for this purpose, such for example, as epoxy or phenolic resins, both of which are non-conductors of electricity, but it will be understood that other suitable materials may be employed for this purpose. The adhesive or resins selected must of course be such that they will readily adhere to the base and the conductors of the circuit, but not to the carrier nor the printed matter thereon if the pattern of the circuit is printed in reverse. Also the base 25 may be made of any desired non-conducting material to which it is desired to apply the circuit. For example, as shown in the drawings, the base 25 may be in the form of a film of the same plastic material of which the adhesive is made, so that after the adhesive hardens, it will be an integral part of the base. The base is preferably made of a thermosetting plastic material which is not affected by heat.

Figure 8:
FIG. 8 is a similar view showing the carrier being stripped or peeled from the base.
Figure 9:
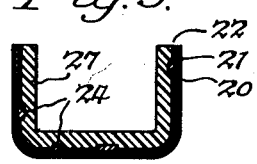
FIG. 9 is a similar cross sectional view showing the carrier applied to a base of approximately U-shape.

When the adhesive has hardened or solidified to the desired extent, the carrier may be stripped or peeled from the base, as indicated in FIG. 8, due to the fact that the adhesive has not adhered to the carrier.

While I have shown in FIGS. 1 to 8 that the circuit is applied to a base having a plane surface, it will be obvious that by making the carrier of a flexible material the circuit can be applied to a base of any other suitable or desired shape. For example, in FIG. 9 I have shown a base 27 of channel or U-shape in cross section, and the carrier may be applied to a base of this type by placing a layer of adhesive material between the base and the carrier. When the adhesive has set or hardened, the carrier can be readily stripped or peeled from the base 27, thus leaving the circuit on the base.

Figure 10:
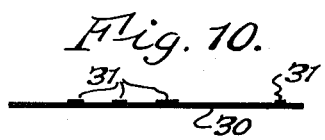
FIG. 10 shows a transverse sectional view of the carrier having a current-conducting circuit printed thereon in accordance with an alternative form of my process.
Figure 11:
FIG. 11 is a similar view thereof showing the carrier after electroplating.
Figure 12:
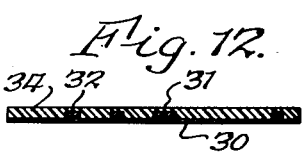
FIG. 12 is a similar view showing the carrier after application of the adhesive material thereto.
Figure 13:
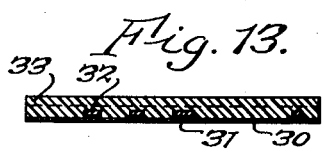
FIG. 13 is a similar view showing the base applied to the adhesive coating.
Figure 14:
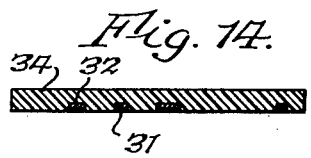
FIG. 14 is a similar view of the complete circuit after removal of the carrier.

The alternative process hereinbefore referred to is illustrated in FIGS. 10 to 14, in which 30 represents the carrier. In this case current-conducting material 31 is printed on the carrier. This printed circuit is consequently increased in thickness by electroplating, thus forming the plated layer 32 on the carrier, as shown in FIG. 11. 33 represents a base to which the electric circuit is to be applied, and 34 represents a layer of a suitable adhesive or cement which is interposed between the base and the carrier, for example, by placing the adhesive or resin on the carrier, as shown in FIG. 12, and then placing the base on the adhesive as shown in FIG. 13. The carrier and base are pressed toward each other so that the adhesive will enter into all of the spaces between conductors of the circuit, and after the adhesive has hardened, the carrier 30 may be removed from the adhesive and from the conductors of the circuit, which are held firmly by the adhesive. 34 represents the resulting base with the circuit sealed thereon or forming an integral part thereof.

Figure 3:
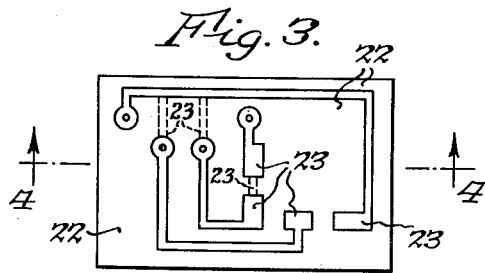
FIG. 3 is a face view of the carrier after the printing has been applied thereto.
Figure 4:
FIG. 4 is a sectional view thereof on line 4—4, FIG. 3.
Figure 5:
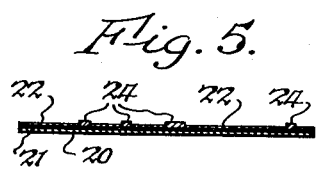
FIG. 5 is a similar sectional view thereof after the carrier has been subjected to electroplating.
Figure 6:
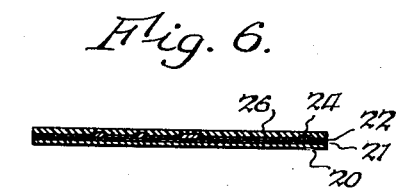
FIG. 6 is a similar view thereof showing a coating of cement or other adhesive applied to the carrier.

When a circuit 23 such as shown in FIG. 3 is printed in conducting material directly on the carrier sheet, the isolated circuit segments, such as indicated by 31, FIG. 10, must be connected together by conducting material, such as 23', which may also be printed on the carrier, but since it is not desired to have this conducting material 23' electroplated, resist material such as 22 is applied over this conducting material. After plating, this conducting material 23' and the resist 22 are removed as herein described.

Figure 15:
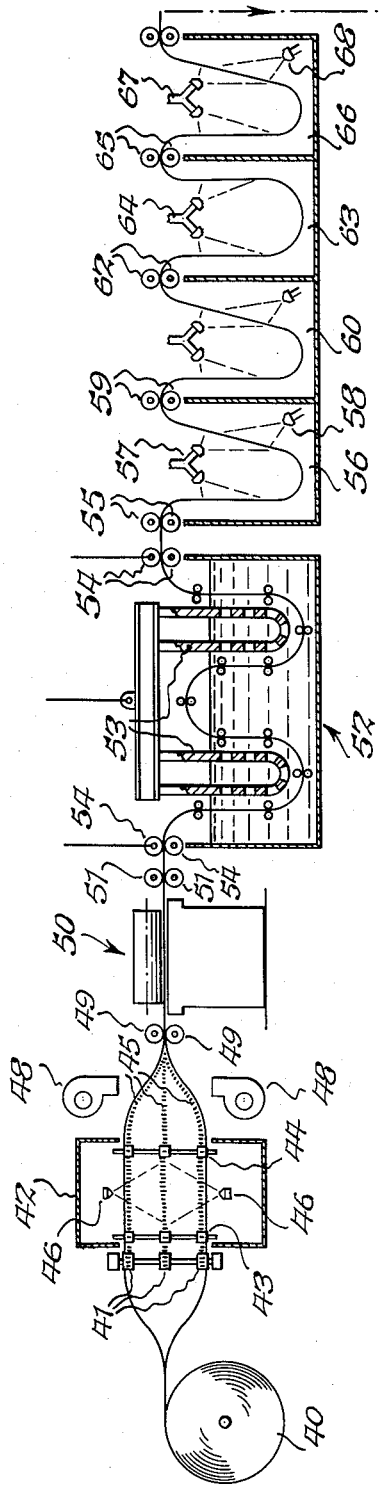
FIG. 15 is an elevation partly in section and partly diagrammatic showing how the method and apparatus disclosed in the preceding figures may be carried on automatically in quantity production.
Figure 15:
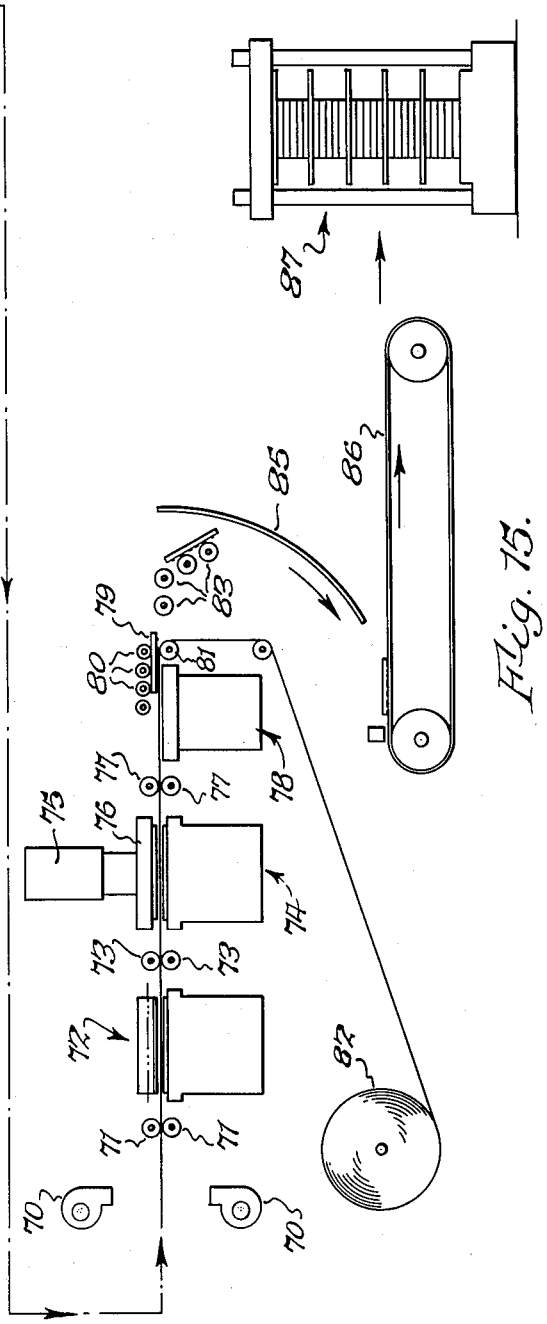

When a large quantity of printed circuits is to be produced, they can be manufactured automatically with a minimum of handling by suitable apparatus, such for example as shown in FIG. 15, in which 40 represents a roll of suitable flexible material, such for example as cellulose acetate, of which the carriers of the printed circuits are to be made. The material drawn from this roll is first turned through an angle of 90° and passes between suitable perforating rollers 41 which provide perforations in the material by means of which it can be fed, preferably intermittently thru the various devices used for forming the printed circuits. These perforations may be of any suitable type, such for example as are commonly used on moving picture films. Perforations are also shown in the longitudinal center of the sheet but these may be omitted if desired. The means for feeding the sheet through the various apparatus are not shown in detail but may be of any usual or suitable type.

After the perforations are formed in the sheet, it is conducted to a spray booth 42 in which a face of the sheet is coated with an electrically conductive coating of any desired type, such for example as a silver solution. The sheet is conducted through the booth 42 by two sets of rollers 43 and 44 which act as sprockets for engaging with the perforations 45 formed in the sheet. The spray booth is provided with suitable jets 46 for applying a conductive coating material on the face of the sheet. On leaving the spray booth 42 the sheet is again turned through 90° into approximately the position which it occupied on leaving the reel 40, but with the coated face upward, and to expedite the drying of the conductive coating, blowers 48 may be provided. The sheet is then fed by means of sprockets 49 to a suitable printing apparatus 50 which is shown diagrammatically and by means of which the resist material is applied to the sheet. If desired, the film after leaving the roll 40 may pass directly to a printing press where a circuit of conducting material may be printed thereon, without the use of a resist.

Two sets of guide rollers or sprockets 51 then conduct the sheet to an electroplating tank 52 of any suitable or usual type which is also shown more or less diagrammatically. The sheet passes between a number of different sets of guide rollers which guide the sheet around anodes 53. Current may be conducted to the carrier sheet in any desired manner, for example by means of metal rollers 54 arranged at opposite ends of the tank and which contact with the current conducting layer or film which has been printed on the carrier or sprayed on the carrier sheet in the spray booth 42. The rate of travel of the sheet is controlled in such a manner that the conductors on the sheet have the desired amount of metal deposited thereon. Then the sheet passes over two rollers or sprockets 55 which carry the sheet successively to a number of tanks or to different compartments of a single tank. The first tank or compartment 56 is a washing compartment provided with spray nozzles 57 and 58 for spraying both sides of the film to remove any electrolyte remaining therefrom. The film then passes over another set of guide rollers 59 into a tank or compartment 60 containing a solvent for the resist. This solvent may be of any suitable or well known type depending on the composition of the resistant which was originally applied by the printing apparatus 50. Another pair of guide rollers 62 then conduct the sheet or carrier into a compartment or tank 63 which has a spray nozzle 64 which directs a warm acid spray against the face of the film for the purpose of removing from the film the conducting coating which was sprayed on the carrier sheet in the spray booth 42. From the tank 63 a pair of rollers 65 conduct the sheet into another compartment or tank 66 which contains spray nozzles 67 and 68 which sprays water at opposite faces of the sheet to thoroughly clean it. The sheet is then conducted past a pair of blowers 70 which dry the sheet after which the same is conducted by rollers 71 to an apparatus 72 for applying an adhesive to the printed circuit on the sheet. This adhesive is applied by means of a roller which is accurately constructed so that the adhesive will be applied only to the circuit printed on the sheet and not on the carrier sheet itself.

Another set of sprockets 73 conducts the sheet to a press 74 by means of which the base material is applied to the sheet. This may be done by means of the usual piston and cylinder type of press 75 equipped with suitable means, not shown, for supplying sheets or layers of the base material between the platen 76 of the press and the sheet. Any well known apparatus may be used for feeding the base material in sheet form to the press so that the base material will be correctly positioned on the carrier sheet. It is of course also possible to apply adhesive to the base sheets rather than to the printed circuits on the carrier sheet, if desired. The carrier sheet is then fed forward by means of another set of sprockets or feed rollers 77 to a table 78 with a relatively flat top. The printed circuits and the base 79 are fed under a set of holding rollers 80 and the sheet passes over a roller 81 slightly beyond the edge of the table so that the sheet is fed downwardly over the roller 81 while the printed circuit and base are held by the rollers 80 to travel in a straight path, thus pulling the carrier sheet from the printed circuit on the base 79. The sheet may then be fed and wound up in a roll 82 or returned to the spray booth 42 for further use, and the printed circuits and their bases pass over rollers 83 from which they are discharged in any suitable manner, for example on a chute 85 by means of which they may be deposited on a conveyor belt 86 from which they may be disposed of in any suitable manner. If the bases applied to the circuits are of the type which require heating under pressure in order to finally harden the same, they may be removed from the conveyor 86 to a multiple platen laminating press 87.

The various sprockets which drive the carrier sheet in the apparatus shown in FIG. 15 may be timed in any suitable manner in accordance with the slowest function to be performed which generally is the plating. Consequently the plating tank must be large enough to plate the desired thickness of metal on the circuits. The radius of the bends about which the carrier sheet is passed must be large enough to prevent the plated circuit from delaminating therefrom. Each of the various sprocket drives may be suitably controlled, preferably by a servo motor controlled by a master control device so that each sprocket will be synchronized with other sprockets.

Since control devices of this type are well known, it is not deemed necessary to illustrate and describe the same. It will, of course, be realized that many changes and additions may be made in and to the apparatus and method shown without departing from this invention.

In views 16 and 17, I have shown a method of producing printed circuits in such a manner that the current may be conducted from a base from one face thereof to the other. Heretofore this has been done mainly by drilling or punching holes in a base and applying metal to the interiors of these holes, which involves additional operations. In accordance with my invention, this may be done by forming a sheet or film 90 in such a manner as to provide projections or dimples 91. This can, for example, be readily done in sheets of thermoplastic material by softening the same by heat. Two such sheets are formed for a single base. These sheets may then be provided with a usual conducting film 92, with the resist 93 and the electroplated parts 94. After the forming of these sheets is completed, the resist and that part of the metal coating which has not been electroplated are removed as heretofore described. A base 96 is then applied to the carrier sheet and this base, as shown, is of a sheet material which may be formed with holes 97 therein through which the dimples or projections extend, as shown in FIG. 17. Consequently when the two bases are brought together the plated portions of the circuit on the dimples or projections of one circuit will contact with those of another. If desired, a filler or adhesive base 99 may be provided between the two bases 96 in order to secure them together. The tabs or projections of the printed circuit may be touched with a paste solder and then heated in any suitable manner, for example by induction heating, so as to produce a good electrical contact between the two conductors covering the projections.

By means of my improved process, it is possible to apply to a printed circuit certain electronic devices before embedding the same and the circuit in a base. For example, in FIG. 18 I have shown printed and electroplated conductors 100 formed on a carrier sheet, and electronic devices 101, 102 and 103 of any suitable or desired types may be soldered or otherwise connected to the printed and electroplated conductors while the same are mounted on the carrier sheet 105. This type of circuit can then be tested in the usual manner while on the carrier sheet, and if there are any defects in this circuit they can be easily corrected. A base 104 in plastic condition can then be applied to the carrier sheet in the usual manner, the base being preferably of a thermo setting adhesive which cures at room temperature and without pressure. After the base has been applied and has become set, the carrier sheet 105 may be peeled from the base and the electric circuit as heretofore described.

It is also possible to construct printed circuits having portions thereof lying in different planes as is clearly shown in FIG. 19 in which the carrier sheet 110 is provided with siutable projections or other irregular indented or extruded portions 111, 112 and 113. If the carrier sheet is of a thermoplastic material, this can be easily done while the carrier sheet is heated. The circuit 117 may then be formed as heretofore by printing and electroplating, whereupon a base 114 preferably in plastic form is applied to the carrier sheet, after which the carrier sheet is peeled off as indicated in FIG. 19. These projecting parts 115, formed by the indentations 111 in the carrier sheet may be of a type well adapted for making electrical connections therewith, for example for connecting electronic device 116 in a circuit.

It is also possible by means of my improvements to provide printed circuits in which the conductors in the circuit will have hardened outer surfaces, as may be desired when the printed circuit cooperates with some movable part, such for example as the contact member may be moved from one conductor to another. When this is to be done, the carrier sheet 120 (see FIG. 20) is provided with the usual conducting layer 121 and resist 122, after which the circuit is subjected to electroplating to form thereon a layer of rhodium, nickel or other hard metal 123. After this coating has been applied to the conductive coating 121 in the parts thereof not covered by the resist, further electroplating may be made by applying copper as indicated at 125 to produce a circuit of the thickness required for the desired current carrying capacity. A base may be applied in the usual manner and after the carrier has been stripped from the base, the printed circuit may be subjected to a mild acid treatment to remove the conductor 121 whereupon the hard surface 123 will be on the outer face of the circuit.

Another improvement in printed circuits is shown in FIGS. 21–23, in which the conductors are slightly modified so that they will better adhere to the bases. In the constructions shown, 130 represents the carrier sheet to which a conductive coating 131 has been applied, and 132 represents the resist and 133 the plated circuit. After the plating has proceeded in the usual manner, the plated surfaces may be provided with a partial coating of resist 134 which covers only portions of the printed circuits. This second resist coating may be in the form of dots or small figures, or may cover the major portion of the coating surfaces with the exception of small openings in the resist. The printed circuit is then subjected to an etching of the metal surface whereupon the portions of the conductors of the circuit will be roughened or recessed, thus forming, for example, a number of depressions or cavities 135 in the printed circuit. After the resist has been removed and the base applied, portions of the base will of course penetrate into the recesses 135 and thus form a secure bond with the printed circuit.

A similar action can be obtained as shown in FIG. 23, if in place of etching out portions of the circuit after the resist 134 has been applied, the printed circuit is subjected to further plating, in which case additional metal parts or projections 136 will be formed on the original plated surfaces, and these projections will then enter into and become embedded in the base to form an effective bond therewith.

The carrier sheet may be made of any suitable flexible plastic or fibrous material, and if desired a thin sheet of a stretchable material may be employed, such as rubber or rubber-like material when such material because of its stretchable nature may be more easily stripped from the circuit printed thereon. The carrier sheet may also be made of thin metal, in which case all parts of the sheet not to be plated must be covered with resist.

In FIGS. 24–26, I have shown how a plated circuit may be formed for easy connection with lead wires or flat lugs. In the construction shown the printed circuit parts are provided with enlargements which can be deformed to produce tabs or projections which may cooperate with a wire lead or flat current-conducting lug. In this case the enlargements of the plating have a hole 140 or a slot 141 in the middle portion thereof provided with outwardly extended slots or weakened portions which terminate at the central hole 140 or slot 141 and which form the side walls of lugs or projections. The printed circuit when transferred to a base 142 is so arranged that the tabs are arranged across relatively large openings 143 and 145 in the base, as clearly shown in FIG. 25. A lead 146 may then be inserted into the middle portion of the round portion of a printed circuit, which will result in bending the tabs downwardly and separating the sides thereof along the slots or weakened portions, and similarly a lug 147 may be inserted through the longitudinal slot 141, thus bending the tabs terminating at this slot downwardly into angular positions in which their ends will be resiliently pressed against the lug 147. I have shown in FIGS. 24, 25 and 26 printed circuits applied to both sides of the base 142, but it will be obvious that a single printed circuit on either face of the base may be provided and, if desired, after the lugs or leads have been inserted into the openings in the printed circuit, solder may be applied at the juncture of the printed circuit and a lead or lug in the depressions formed by bending the tabs downwardly.

The advantage of this construction is that the holes or openings in the printed circuit into which the leads or lugs are to be inserted can be made larger than would ordinarily be necessary, thus allowing for inaccuracies or misalinements in the leads or lugs when forming parts of another panel or circuit to be applied to the printed circuit.

It will be understood that various changes in the details, materials and arrangements of parts which have been herein described and illustrated in order to explain the nature of the invention may be made by those skilled in the art within the principle and scope of the invention as expressed in the appended claims.

I claim:

1. A method of making a printed electrical circuit, which comprises forming an outwardly extending projection on each of two flexible carrier sheets, forming printed electrical circuits on both of said sheets including said projections, applying said carrier sheets to opposite faces of a base having apertures therein, placing said carrier sheets on said base with said projections extending through said apertures and with the projections of one carrier sheet contacting with the projections of the other carrier sheet, and then removing said carrier sheets from said circuits.

2. A method according to claim 1 and including the step of soldering together the meeting ends of said projections of said circuit parts.

3. A method of making a printed electrical circuit, which comprises the step of printing on a non-conducting, flexible and stretchable carrier a pattern in electricity conducting material including the desired circuit, depositing metal on said circuit by electroplating until the conducting parts attain the desired thickness, applying to the circuit on said carrier a base in a plastic state, said base being of a material having the property of adhering to said circuit and non-adhesive to said carrier to permit said circuit to rigidly attach itself in said base when said base is hardened, and then stretching said carrier to release said printed circuit from said carrier.

4. A method of making a printed electrical circuit having a part formed for connection with another conductor, comprising the steps of applying a printed metallic film to a flexible, non-metallic carrier to produce an exposed printed electric circuit of current conducting material thereon, depositing metal on said exposed circuit until the conducting parts thereof attain the desired thickness, said deposited conducting parts having a portion thereof which is deformable and which is slit to provide flexible tabs applying a layer of adhesive to a base, said base having an opening therethrough, applying said carrier to the adhesive on said base so that the deformable portion of the circuit extends over said opening, and stripping said carrier from said circuit after said adhesive has hardened, whereby a conductor may be forced into said opening through said deformable portion to flexibly make electrical contact with said circuit.

5. The method of manufacturing printed electric circuits, comprising passing an elongate sheet of a flexible, non-conductive material through a plurality of stations successively, printing an electrically-conductive circuit of a desired configuration at spaced intervals longitudinally along said sheet by passing said sheet through a printing station, increasing the thickness of each of the conductive circuits by then passing said sheet through an electroplating bath, then applying to each of said circuits an electrically non-conductive adhesive which will adhere to the circuit but not to said sheet, and pressing a non-metallic base on each of said circuits in succession as said elongate sheet passes a subsequent station to adhere said base to each of said circuits, permitting said adhesive to harden, and then stripping said sheet successively from each of said circuits to leave on each of said bases a printed circuit.

6. A method of manufacturing printed electric circuits comprising passing an elongate sheet of a non-metallic flexible carrier through a plurality of stations successively, spraying a thin coat of conducting material on said carrier at a first station as it passes therethrough, printing a reverse pattern of the desired circuit configuration on said conducting material with a non-conducting material as said carrier passes through a second station, the printing being so effected that successive reverse patterns are spaced from one another longitudinally of the carrier, and the carrier being of such a length as to receive a plurality of such spaced reverse patterns, then passing the printed carrier through an electroplating bath at a third station to increase the thickness of the remaining exposed portions of the conducting material of each of said circuits, then passing said carrier through a fourth station to progressively remove the printed non-conducting coating and the thin conducting coating, which was not affected by the electroplating bath, as the carrier passes through said fourth station, then applying adhesive material, which will adhere to the bases and to said exposed circuits but not to said flexible carrier, to said carrier to cover each of said electroplated circuits successively as the carrier passes through a fifth station, then pressing an individual base on each of said adhesive covered circuits at a sixth station to adhere the individual bases successively to the successive exposed circuits, permitting said adhesive to harden, and then stripping said carrier from each of said circuits in succession to leave on each of said bases a printed circuit embedded in said adhesive.

7. A method of making a printed electrical circuit which comprises deforming each of two flexible carrier sheets to cause portions thereof to extend into planes other than the plane of the main body portion of the sheet, depositing metal on both the deformed and the main body portions of each sheet by electroplating to form a printed electric circuit, disposing between the two carrier sheets a base having apertures therein, placing said carrier sheets on said base with said deformed portions of each carrier sheet extending through said apertures and contacting the deformed portions of the other carrier sheet, after applying adhesive between the two carrier sheets and the opposite sides of said base, permitting said adhesive to harden, and then stripping said carrier sheets from each of said printed circuits, thereby leaving printed circuits on said opposite sides of the base with portions thereof in electrical contact with each other through said apertures.

8. A method of making a printed electrical circuit, which comprises the steps of applying a printed metallic film to a flexible non-metallic carrier sheet to produce an exposed electric circuit of current-conducting material thereon, depositing metal on said exposed circuit by electroplating to increase the thickness of said circuit, connecting to said circuit electronic devices, testing said circuit and devices while on said carrier sheet, applying a base in plastic form to said circuit and carrier sheet to cover said carrier and said electronic devices, permitting said base to harden, and then stripping said carrier sheet from said base to form an exposed electric circuit having electronic devices embedded in said base.

9. The combination with a base of non-conductive material, said base having a hole therethrough, of an electrically conducting printed circuit of a desired circuit configuration attached to said base, said printed circuit being of uniform thickness and having a deformable portion extending over said hole, said deformable portion being slit to form flexible tabs which are separable from one another, and a conductor extending through said hole between opposed edges of said tabs, said opposed edges of said tabs being spaced from one another a distance less than the thickness of said conductor, said tabs engaging said conductor flexibly to make good electrical contact therewith.

10. The combination with a base of non-conductive material having a hole therethrough, of printed electrical circuits of a desired circuit configuration attached to opposite sides of said base, each of said printed circuits being of uniform thickness and having a deformable portion extending over said hole, the deformable portion of each printed circuit being slit to form flexible tabs, and a conductor inserted through said hole and deformable portions, opposed edges of said tabs being spaced from one another a distance less than the thickness of said conductor, thereby to flexibly make electrical contact with said conductor at both sides of said base.

11. A method of making a printed electrical circuit, which comprises the steps of applying a printed metallic film to a flexible non-metallic carrier to produce an exposed electric circuit of current-conducting material on said carrier having spaced conducting portions, depositing metal on said conducting portions by electroplating to increase the thickness of said conducting portions, then applying between said carrier and an insulating base a layer of insulating adhesive material which will adhere to said base and to said conducting portions but which will not adhere to said carrier, and pressing said base and carrier together to force the adhesive into the spaces of said carrier between said conducting portions to the thickness of said conducting portions, and peeling said carrier from said adhesive material, from said electric circuit and from said base, to leave said circuit on said base substantially flush with the surface of said adhesive.

12. A method of making a printed electrical circuit, which comprises applying to a thin flexible carrier of electrically non-conducting material a thin coating of conducting material, printing on said coating a non-conducting composition in a reverse pattern thus leaving exposed a pattern of the circuit to be formed, increasing the thickness of said exposed pattern by electroplating, removing the non-conducting composition, removing by chemical action said thin coating of conducting material except where it is protected by said electro-plating, transferring said pattern to a base by applying to said pattern, to said carrier and to said base a layer of an electrically non-conductive adhesive plastic resin which is of a thickness equal to the thickness of the electroplated pattern and which adheres to said base and to said pattern but does not adhere to said carrier, pressing said base and carrier together to force the adhesive into the spaces between the different parts of said pattern, and peeling said carrier from said pattern and from said base when said adhesive has become hardened, to leave said pattern on said base substantially flush with the surface of said adhesive.

References Cited in the file of this patent

UNITED STATES PATENTS

| 2,019,625 | O'Brien | Nov. 5, 1935 |
| 2,447,541 | Sabee et al. | Aug. 24, 1948 |
| 2,473,705 | George | June 21, 1949 |
| 2,555,874 | Coughlin | June 5, 1951 |
| 2,692,190 | Pritikin | Oct. 19, 1954 |
| 2,706,697 | Eisler | Apr. 19, 1955 |
| 2,733,180 | Pinto | Jan. 31, 1956 |
| 2,739,881 | Kepple | Mar. 27, 1956 |
| 2,745,170 | Nims | May 15, 1956 |
| 2,781,820 | Rogers | Feb. 19, 1957 |
| 2,783,193 | Nieter | Feb. 26, 1957 |
| 2,795,032 | Kerstetter | June 11, 1957 |
| 2,849,298 | Werberig | Aug. 26, 1958 |

FOREIGN PATENTS

| 9,982 | Great Britain | of 1843 |